(12) United States Patent
Bosworth (10) Patent No.: US 10,893,052 B1
(45) Date of Patent: Jan. 12, 2021

(54) DURESS PASSWORD FOR LIMITED ACCOUNT ACCESS

(71) Applicant: Facebook, Inc., Menlo Park, CA (US)

(72) Inventor: Andrew Garrod Bosworth, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 346 days.

(21) Appl. No.: 15/924,738

(22) Filed: Mar. 19, 2018

(51) Int. Cl.
*H04L 29/06* (2006.01)
*G06F 21/31* (2013.01)
*G06F 21/62* (2013.01)

(52) U.S. Cl.
CPC ............ *H04L 63/105* (2013.01); *G06F 21/31* (2013.01); *G06F 21/629* (2013.01); *H04L 63/083* (2013.01); *H04L 63/102* (2013.01); *G06F 2221/2113* (2013.01); *G06F 2221/2141* (2013.01)

(58) Field of Classification Search
CPC ...... H04L 63/105; H04L 63/083; G06F 21/31
See application file for complete search history.

(56) References Cited

U.S. PATENT DOCUMENTS

| | | | | |
|---|---|---|---|---|
| 8,868,036 B1* | 10/2014 | Nasserbakht | ......... | G06F 1/1654 455/410 |
| 9,071,618 B1* | 6/2015 | Pruthi | .................... | H04L 63/105 |
| 9,959,694 B2* | 5/2018 | Lindsay | ................. | G07F 7/1025 |
| 10,110,385 B1* | 10/2018 | Rush | ....................... | H04L 9/3247 |
| 10,389,736 B2* | 8/2019 | Dawes | ..................... | H04L 63/08 |
| 10,403,270 B1* | 9/2019 | Homewood | ........ | G10L 15/1822 |
| 2013/0099928 A1* | 4/2013 | Daly | ......................... | G07C 9/27 340/573.1 |
| 2016/0050209 A1* | 2/2016 | Govande | ............... | H04W 12/06 726/7 |
| 2016/0253458 A1* | 9/2016 | Balwani | ................ | H04L 9/3226 705/2 |
| 2016/0292461 A1* | 10/2016 | Yan | ...................... | G06F 21/6218 |
| 2018/0034639 A1* | 2/2018 | Resch | .................... | H04L 63/083 |
| 2018/0060842 A1* | 3/2018 | Waltermann | ........ | G06Q 20/4016 |
| 2018/0288065 A1* | 10/2018 | Selgas | .................... | H04L 63/104 |
| 2018/0349581 A1* | 12/2018 | Ramalingam | ......... | H04L 9/3226 |
| 2019/0035242 A1* | 1/2019 | Vazirani | ................. | G08B 15/00 |
| 2019/0052661 A1* | 2/2019 | Anand | ................ | H04L 63/1433 |
| 2019/0065714 A1* | 2/2019 | Adams | ..................... | G06F 21/31 |
| 2019/0220584 A1* | 7/2019 | Schiller | ................... | G06F 21/32 |
| 2019/0319948 A1* | 10/2019 | Triola | .................... | H04L 9/3218 |

* cited by examiner

*Primary Examiner* — Lynn D Feild
*Assistant Examiner* — Viral S Lakhia
(74) *Attorney, Agent, or Firm* — Fenwick & West LLP (57) ABSTRACT

An online system, an application on a computing device, or an operating system of a computing device stores a primary password and a duress password for a user account. The primary password grants access to the user account in a regular access mode, which allows the user to access any account data that is ordinarily accessible to the user. The duress password grants access to the user account in a limited access mode that makes at least some of the account data inaccessible to the user. The limited access mode can make some of the account data inaccessible while still providing the appearance of full access. For example, some of the account data remains accessible in the limited access mode while more sensitive account data is made inaccessible. The limited access mode can also display a mock error message to provide the appearance of a technical error.

20 Claims, 10 Drawing Sheets

DURESS PASSWORD FOR LIMITED ACCOUNT ACCESS

BACKGROUND

This invention relates generally to controlling access to a user account, and more particularly to granting limited access to a user account upon determining that a user has provided a duress password.

Many people store a large amount of personal data on their computing devices and in their user accounts with online services. For instance, a typical mobile phone contains text messages, emails, calendar events, contacts, photos, and other data that the user might not wish to share with others. Similarly, a user's social media account or account with some other type of online service may also contain private messages exchanged with other users, photos, text posts, and other data that was only intended to be shared with a small group of friends.

Typically, users protect their personal data by setting a password to prevent others from accessing their computing devices or user accounts. However, under some circumstances a user may be compelled by an attacker to divulge their password under duress. For instance, an abusive spouse or significant other may force a partner to divulge the password to his or her mobile phone on an unfounded suspicion that the partner has been unfaithful. In these situations, conventional methods of protecting a device or account with a single password may be inadequate to circumvent an attacker.

SUMMARY

An online system, an application on a computing device, or an operating system of a computing device stores a primary password and a duress password for a user account. The primary password grants access to the user account in a regular access mode, which allows the user to access any account data that is ordinarily accessible, such as the user's profile information, messages, events, and contacts. The duress password grants access to the user account in a limited access mode that makes at least some of the account data inaccessible to the user.

The limited access mode can make some of the account data inaccessible while still providing the appearance of full access. For example, predetermined categories of account data (such as publicly accessible information in the user's profile) remains accessible in the limited access mode while other categories of account data (such as private messages) are made inaccessible. As another example, the user can mark certain data items (such as messages, events, or contacts) as accessible when accessing the account in the normal access mode, and the marked data items are made accessible in the limited access mode while unmarked items are inaccessible.

The limited access mode can also make some or all of the account data inaccessible by displaying a mock error message that provides the appearance of a technical error. For example, the user is shown a message that his or her account data is temporarily inaccessible because it is being transferred to a new server.

In some embodiments, the limited access mode uses a combination of these approaches. For instance, publicly accessible profile information and any marked events and contacts remain accessible in the limited access mode, but a mock error message is displayed when the user attempts to access the private messages associated with the user account.

After entering the limited access mode, the user is re-authenticated before regular access to the user account is restored. To guard against an attacker forcing the user to perform the re-authentication process under duress, the re-authentication process can be configured to be more difficult than simply entering the primary password. For example, the user may be prompted to provide additional authentication information beyond the primary password in order to be re-authenticated. For instance, the user may be prompted to answer a security question or provide a token generated by a multi-factor authentication application or device. As another example, entering the limited access mode may initiate a lock-out period during which the user cannot be re-authenticated even if the correct re-authentication information is provided.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
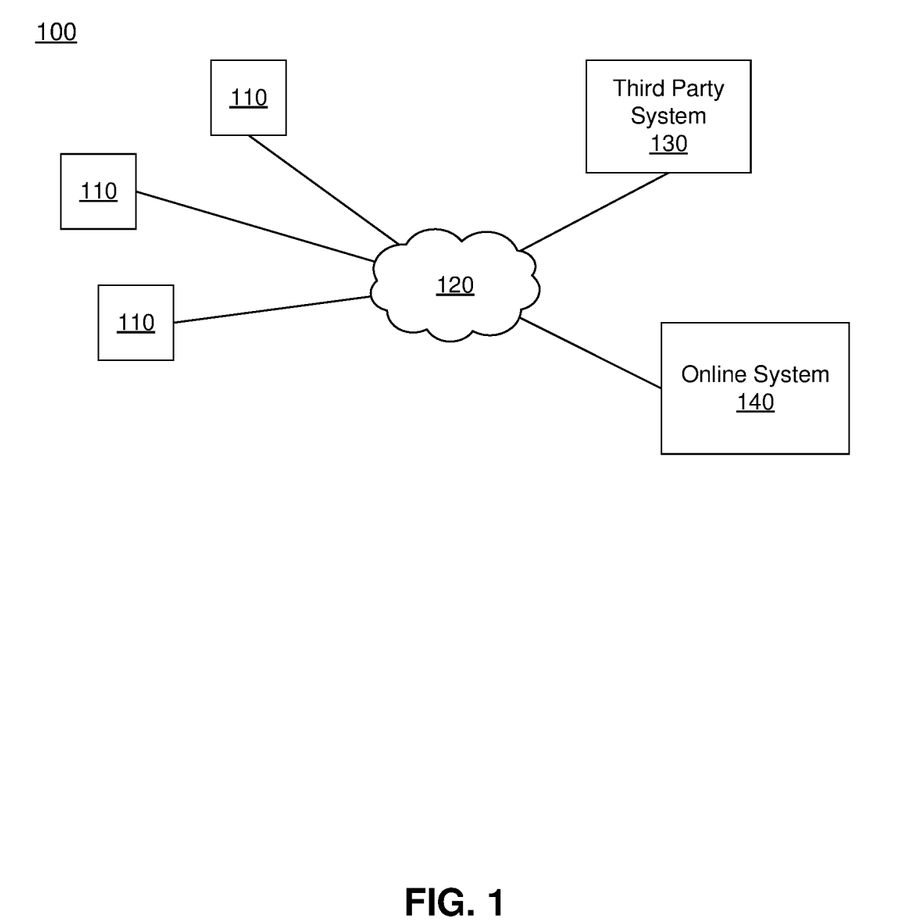
FIG. 1 is a block diagram of a system environment in which an online system operates, in accordance with an embodiment of the invention.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 provides an online service to one or more users. For example, the online system 140 is a social networking system, a multimedia streaming system, an online file storage system, an online email system, an online calendar system, or a system that provides some combination of these online services to users.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone, a tablet, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party website 130 may also communicate information to the online system 140, such as advertisements, content, or information about an application provided by the third party website 130.

Figure 2:
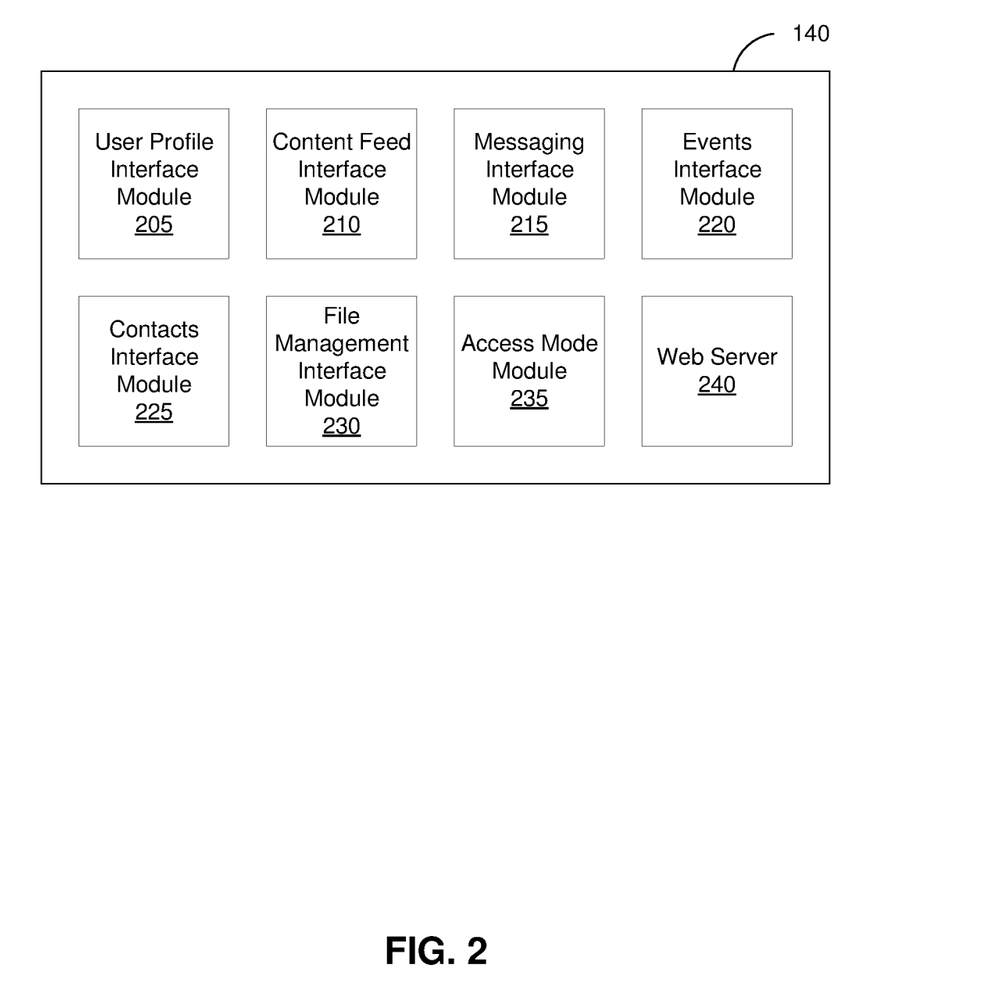
FIG. 2 is a block diagram of an online system, in accordance with an embodiment of the invention.

FIG. 2 is an example block diagram of an architecture of the online system 140. The online system 140 shown in FIG. 2 includes a user profile interface module 205, a content feed interface module 210, a messaging interface module 215, an events interface module 220, a contacts interface module 225, a file management interface module 230, an access mode module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each of the interface modules 205 through 230 presents one or more user interfaces that allows the user to interact with a plurality of data items. As referred to herein, a data item is any piece of information associated with a user account that can be displayed to a user when the user is accessing the user account. For instance, a data item may be a piece of biographical information in a user profile, a content item in a content feed presented to the user, a message sent between two or more user accounts, an event displayed on the user's calendar, a contact in the user's contact list, or a file (e.g., a photo, a video, or a document) stored in association with the user profile.

The user profile interface module 205 allows a user to view and modify data items that are displayed as part of a user profile for the user's account on the online system. The data items in a user profile may include, for example, biographical information about the user, a profile photo and/or cover photo representing the user, and one or more content items (such as text posts, photos, and links to external web pages) that the user has added to a timeline that is displayed as part of the user's profile.

The content feed interface module 210 selects content items to present to the user, determines the order in which to present the selected content items, and presents a content feed that contains the selected content items in the determined order. In an embodiment where the online system 140 is a social networking system, the content feed is a news feed that includes a combination of content items posted by the user's friends, pages that the user is following, and advertisements. As another example, if the online system 140 is a multimedia streaming system, the content feed might be a recommendations page that includes recommended content items such as videos or music that can be streamed from the system.

The messaging interface module 215 allows the user to view and send messages between user accounts on the online system 140. In one embodiment, the messaging interface module 215 implements a chat feature on the online system 140 that primarily sends relatively short chat messages in plaintext (i.e., text without formatting). The messaging interface module 215 can additionally or alternatively allow the user to view and send email messages to other user accounts on the online system 140 and to email addresses maintained by other systems.

The events interface module 220 displays events maintained by the online system. Each event includes, for example, a date and time, a place, a title, and a description of the event. In one embodiment, the events interface module 220 allows the user to add events to a calendar interface.

The contacts interface module 225 displays a contact list containing identifying information for one or more people associated with the user account. If the online system 140 is a social networking system, the contact list may be a list of names or account identifiers for other accounts that are connected to the user account (e.g., the friends list for the user account). In other embodiments, the contact list may additionally include contact information for each person in the contact list, such as an email address, phone number, or street address.

The file management interface module 230 displays one or more files associated with the user account. Files may include photos, documents, audio files, or video files. The files associated with a user account may be uploaded to the online system 140 by the user account or uploaded by a different account and shared with the user account.

The access mode module 235 implements different access modes for user accounts on the online system 140. The access mode module 235 may also implement a re-authentication process to restore access to a user account in the regular access mode after the account has been accessed in the limited access mode. The operation of the access mode module 235 is described in further detail below with respect to FIGS. 4, 5A-5E, and 6.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored on the online system 140. Additionally, the web server 240 may provide application programming interface (API) functionality to send data directly to native client device operating systems, such as IOS®, ANDROID™, WEBOS® or RIM®.

Figure 3:
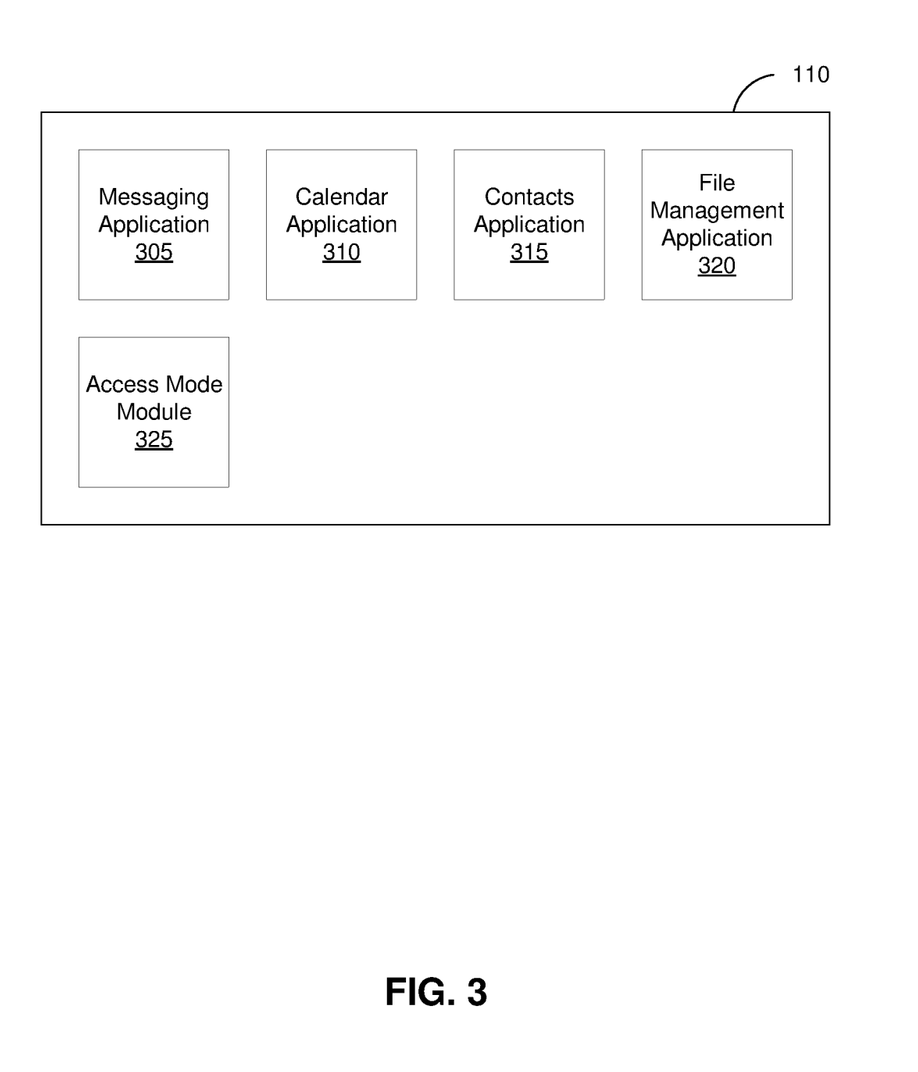
FIG. 3 is a block diagram of a client device, in accordance with an embodiment of the invention.

FIG. 3 is an example block diagram of an architecture of the client device 110. The client device 110 shown in FIG. 3 includes a messaging application 305, a calendar application 310, a contacts application 315, a file management application 320, and an access mode module 325. In other embodiments, the client device 110 may include additional, fewer, or different components for various applications. Additional software components such as a web browser, operating system and hardware components such as a processor, memory, a display, and the like are not shown so as to not obscure the details of the system architecture.

Each of the applications 305 through 320 may be implemented as a native application executing on the client device, a web application in a web browser application on the client device, or implemented in some other manner. An application that is implemented as a native application may be included as built-in applications that are installed on the client device 110 at the same time as the operating system, or as third-party applications that the user can download and install on the client device 110. The functionality of each of the applications 305 through 320 is similar to the functionality of one of the corresponding interface modules 215 through 230 described above with respect to FIG. 2. Accordingly, a detailed description of these applications 305 through 320 is omitted for the sake of brevity.

The functionality of the access mode module 325 is similar to the functionality of the access mode module 235. In one embodiment, the access mode module 325 is a module in the operating system of the client device 110, in which case the module 325 can implement different access modes for the operating system, the applications 305 through 320, and any other applications installed on the client device 110. In another embodiment, the access mode module 325 is part of one of the applications 305 through 320 shown in FIG. 3, or as part of a different application on the client device 110, in which case the module 325 implements different access modes for that application.

Granting Limited Access to a User Account

Figure 4:
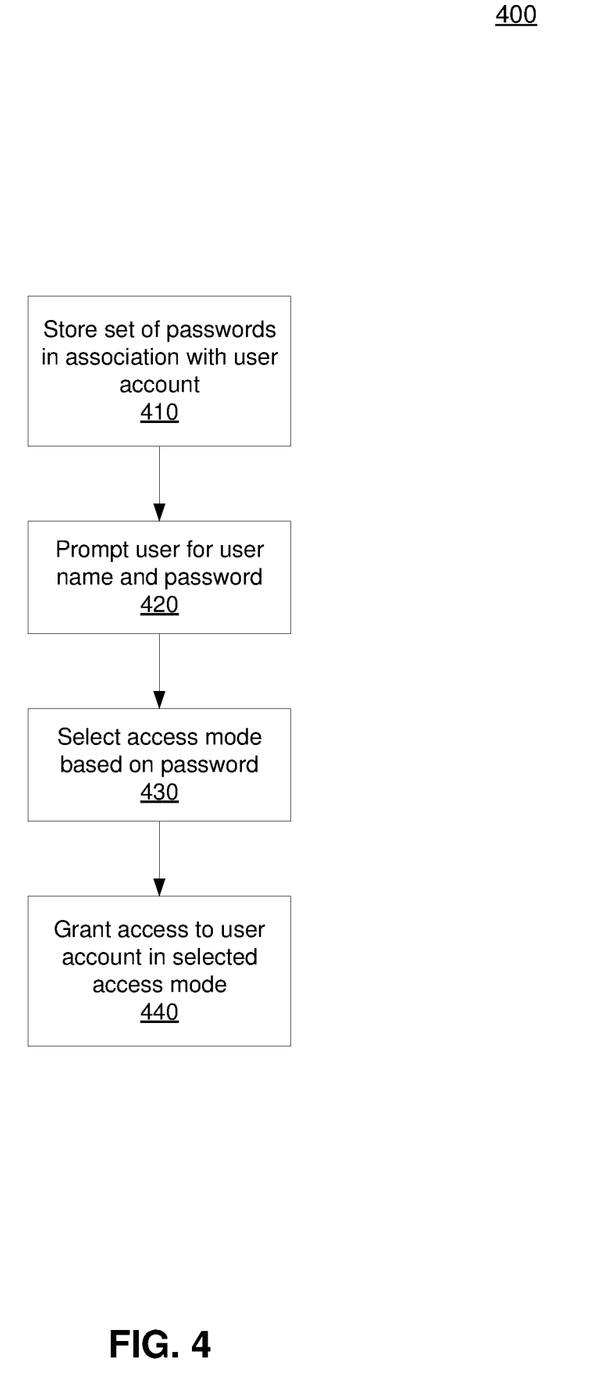
FIG. 4 is a flow chart illustrating a process for granting limited access to a user account upon determining that a user has provided a duress password, in accordance with an embodiment of the invention.

FIG. 4 is a flow chart illustrating a method 400 for granting limited access to a user account upon determining that a user has provided a duress password. In other embodiments, the method may include different and/or additional steps than those shown in FIG. 4. Additionally, steps of the method may be performed in different orders than the order described in conjunction with FIG. 4 in various embodiments. Although the method 400 is described below as being performed on the online system 140 (e.g., by the access mode module 235 shown in FIG. 2), the method 400 may also be implemented on a client device 110 (e.g., by the access mode module 325 shown in FIG. 3).

The online system 140 stores 410 a set of passwords in association with a user account. The set of passwords includes both a primary password and as duress password. In various implementations, the passwords can be arbitrary- or fixed-length character strings (e.g., strings that can contain any letter, number, or other character). In other implementations, the passwords can be limited to a smaller range of characters. For example, the passwords can be arbitrary- or fixed-length strings of numerical digits between 0 and 9 (e.g., a four- or six-digit PIN). In still other implementations, the password can be a pattern that the user draws on a display of his or her client device. For example, the online system 140 presents a grid of dots, and the password is a predetermined path through the grid that connects some or all of the dots.

In one embodiment, the online system 140 receives both the primary password and the duress password from the user. For example, when the user is accessing the user account in the regular access mode or when the user creates the user account, the online system 140 presents a user interface that allows the user to specify both the primary password and the duress password.

In other embodiments, the online system 140 receives the primary password from the user and generates the duress password based at least in part on the primary password. For example, the online system 140 generates the duress password by adding one or more predetermined strings of characters to the beginning, middle, or end of the primary password (e.g., a string such as "911" or "SOS" is added to the primary password). As another example, the online system 140 generates the duress password by performing modular addition to add or subtract a predetermined value to the characters in one or more predetermined positions of the primary password. For example, in an implementation where the primary password is a six-digit number, the duress password may be generated by performing modular addition to add 2, 4, and 6, respectively, to the last three digits of the primary password.

As used herein, storing 410 each password in the set of passwords refers to any suitable method of securely storing a password. In one embodiment, the online system 140 stores 410 each password in the set of passwords as plaintext. In other embodiments, the online system 140 stores 410 a representation of each password (rather than a plaintext password) for improved security. For example, the online system 140 stores a hash of a password, a salted hash of a password, or an encrypted version of a password.

When a user attempts to access a user account, the online system 140 prompts 420 the user for a user name and password. For instance, the online system 140 communicates with a web browser application or a native application on a client device 110 to present a user interface with fields for the user to provide the user name and password associated with the user's account, and the online system 140 receives the user name and password from the client device 110.

After receiving the user name and password, the online system 140 selects 430 an access mode based on the password. For instance, the online system 140 identifies the user account based on the received user name, accesses the set of passwords for the identified user account, and matches the received password to one of the passwords in the set. If the received password matches the primary password, then the online system 140 selects 430 the regular access mode. If the received password matches the duress password, then the online system 140 selects 430 the limited access mode. If the received password does not match either the primary password or the duress password, then the online system 140 performs some other action, such as presenting an error message to the user.

The manner in which the online system 140 matches the received password to the set of password depends on the manner in which the set of passwords is stored. If the set of passwords is stored as plaintext, then the online system 140 matches the received password in plaintext to the passwords in the set. If the set of passwords contains representations of each password (e.g., a hash of each password or an encrypted versions of password), then the online system 140 (or the client device 110) generates a representation of the received password in the same manner and matches the representation of the received password to the passwords in the set.

The online system 140 grants 440 access to the user account in the selected access mode. If the regular access mode was selected 430 (i.e., because the user provided the primary password), then the online system 140 grants 440 access to the user account in the regular access mode. In the regular access mode, the user can access any data associated with the user account that is ordinarily accessible, such as the user's profile information, messages, events, and contacts. For example, the user can interact with the interface modules described above in with respect to FIG. 2 to view, interact with, and/or modify any data item presented as part of these interfaces.

If the limited access mode is selected 430 (e.g., because the user provided the duress password), then the online system 140 grants 440 access to the user account in the limited access mode. In the limited access mode, at least some data items that are accessible in the regular mode are inaccessible to the user. The online system 140 can use a combination of one or more different methods to make data items inaccessible in the limited access mode.

In a first method, the online system 140 specifies predetermined sets of data items that are either accessible or inaccessible in the limited access mode. The predetermined sets can be defined based on any characteristic of a data item, such as whether the data item is publicly accessible on the online system, a timestamp associated with the online system, or the category of the data item.

Figure 5A:
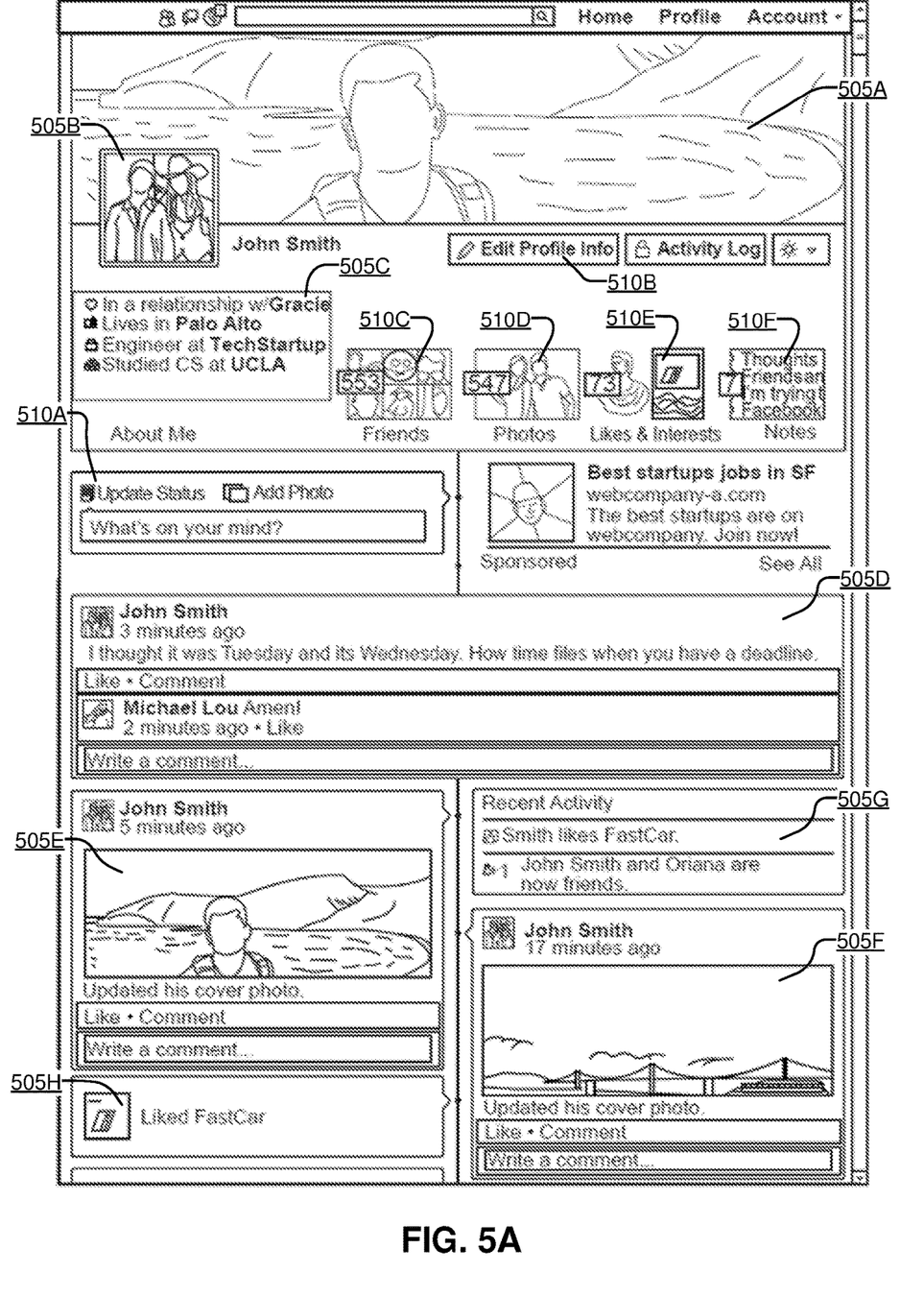
FIGS. 5A-5B are screenshots illustrating an example of one method of making data items inaccessible in the limited access mode, in accordance with an embodiment of the invention.
Figure 5B:
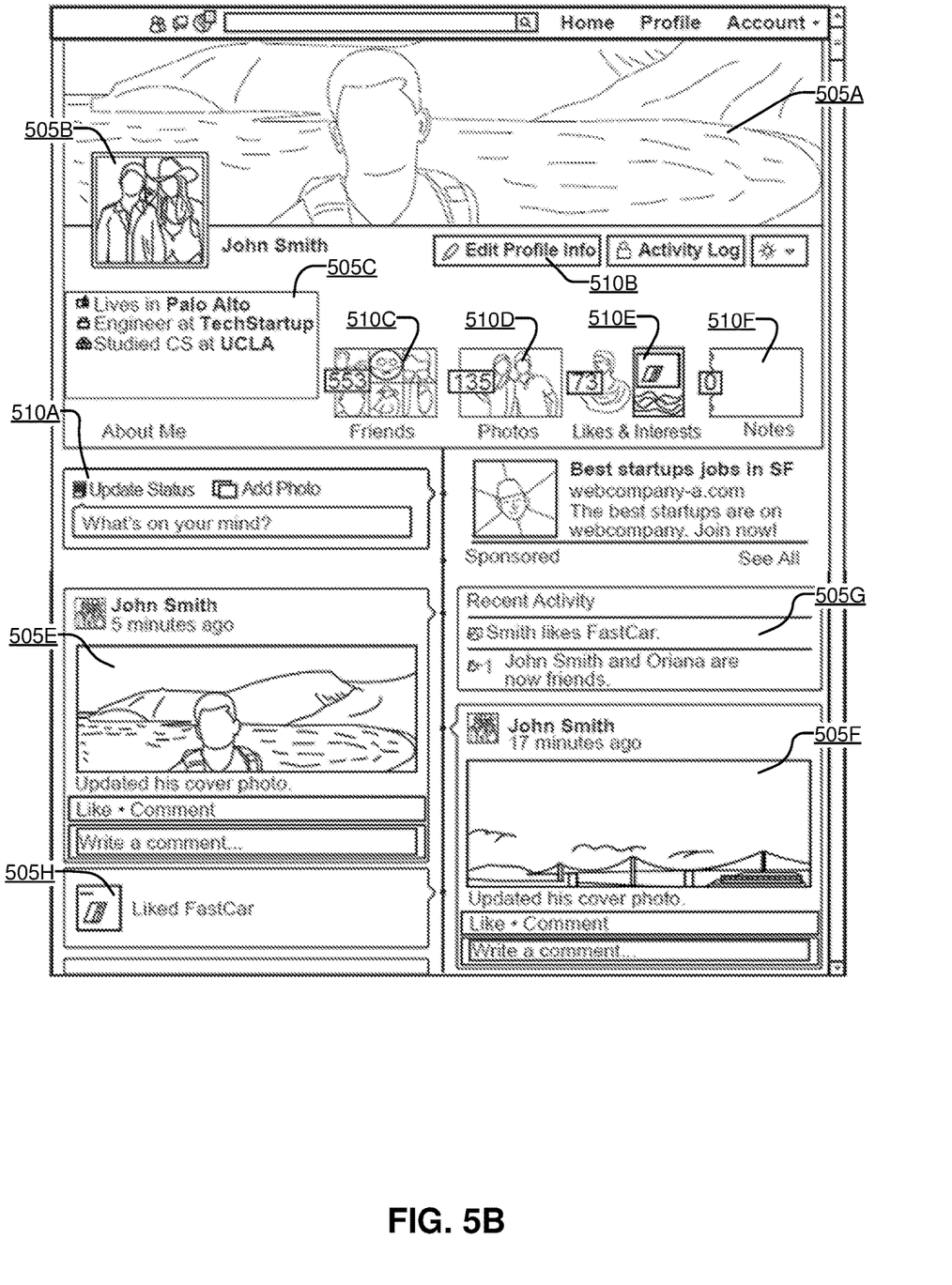

FIGS. 5A and 5B illustrate an example of the first method. In the example shown in FIGS. 5A and 5B, data items that are publicly accessible on the online system are accessible in the limited access mode, while data items that are not publicly accessible are inaccessible in the limited access mode. FIG. 5A is a screenshot of a user profile interface presented by the online system 140 while operating in the regular access mode. The user profile interface displays data items 505A through 505H in the user's profile and further includes interface elements 510A through 510F that allow the user to post a content item to a timeline associated with the user profile, edit information associated with the user profile, and access separate interfaces to view the user's friends, photos associated with the user, likes and interests, and notes.

The example user profile shown in FIG. 5A contains several data items, including a cover photo 505A, a profile picture 505B, and several pieces of biographical information 505C about the user. In addition, a timeline containing additional data items is displayed as part of the user profile. In the example shown in FIG. 5A, the timeline includes a text post 505D, two recent changes 505E, 505F to the user's cover photo, and recent activity 505G, 505H that the user has performed on the online system 140. For purposes of example, it is assumed that the user's relationship status (one of the pieces of biographical information 505C) and the text post 505D on the timeline are only accessible to the user's friends on the online system 140, while the other data items shown in the user profile are publicly accessible. Furthermore, it is assumed that only 135 of the 547 photos that are associated with the user's account are publicly accessible (e.g., because the privacy settings for the remaining 412 photos make them inaccessible to the general public) and none of the notes associated with the user's account are publicly accessible.

FIG. 5B is a screenshot of the user profile interface in the limited access mode. In the limited access mode, the publicly accessible data items (e.g., the cover photo 505A, profile picture 505B, three of the four pieces of biographical information 505C, recent cover photo changes 505E, 505F, and recent activity 505G, 505H) are accessible to the user. In addition, the interface elements 510A through 505F are still displayed as part of the user profile interface. However, the user's relationship status and the text post (which were not publicly accessible) are both inaccessible, and the interface elements 510D, 510F to access the user's associated photos and notes are updated to display the number of photos/notes that are accessible in the limited access mode. By displaying the interface elements along with the publicly accessible data items in the user's profile, the limited access mode provides the appearance of full access while still concealing certain data items, such as the user's relationship status, that may reveal sensitive personal information about the user.

As another example of the first method, the online system 140 can also make data items accessible or inaccessible based on their timestamp (i.e., a time and date associated with the data item that specifies when the data item was created or most recently edited). For instance, the online system 140 makes any data item having a timestamp within a predefined preceding time interval (e.g., the past week, the past month, the past year) accessible in the limited access mode, while data items having an older timestamp are inaccessible.

As still another example of the first method, the online system 140 can make data items accessible or inaccessible based on their type. For example, data items that are displayed as part of the user profile are accessible in the limited access mode (regardless of whether those data items are ordinarily accessible to the public or only accessible to the user's friends), while private messages sent to and from the user account are inaccessible.

In a second method, the online system 140 can allow the user to mark data items when accessing the user account in the regular access mode. For example, the online system 140 interacts with the user's client device 110 to display a user interface that allows the user to select one or more data items to mark. The online system 140 receives the selections from the client device 110 and marks the selected data items. When the user account is accessed in the limited access mode, the online system 140 makes the marked data items accessible to the user while making any unmarked data items inaccessible to the user. In other words, the online system 140 allows the user to select the data items that will be displayed in the limited access mode. Alternatively, the online system 140 can make the marked items inaccessible in the limited access mode (i.e., the user selects the data items that will be hidden in the limited access mode).

Figure 5C:
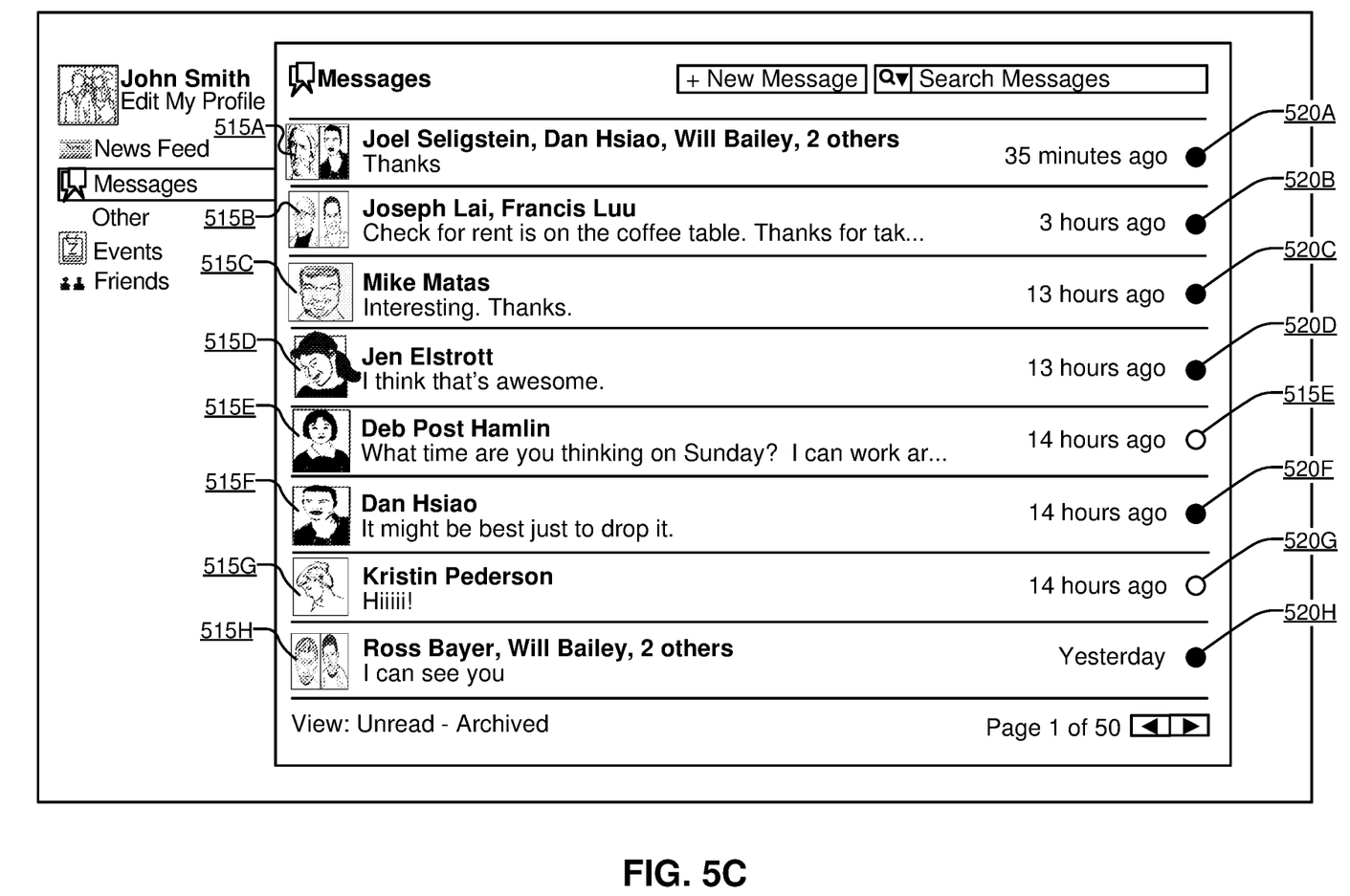
FIGS. 5C-5D are screenshots illustrating an example of another method of making data items inaccessible in the limited access mode, in accordance with an embodiment of the invention.
Figure 5D:
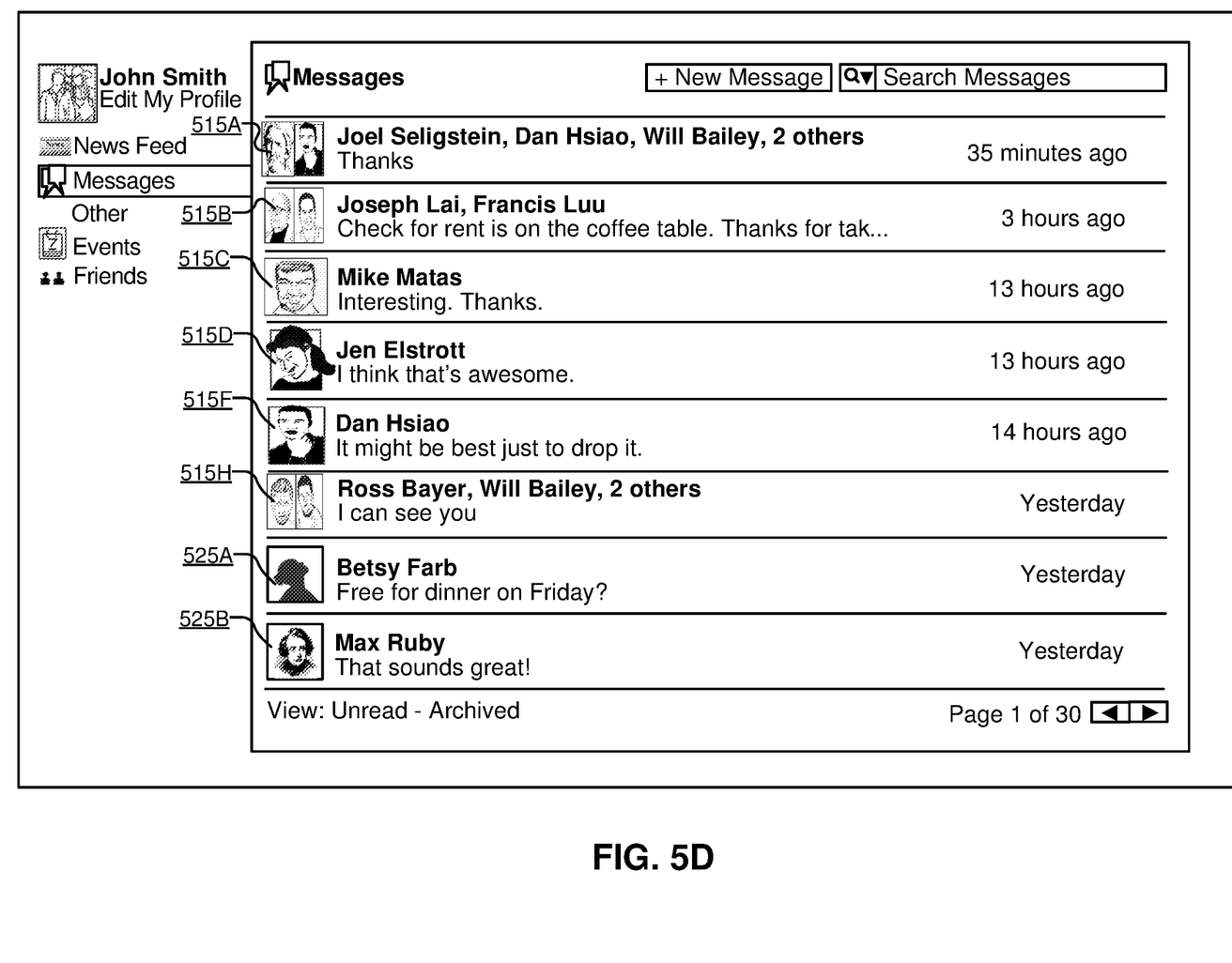

FIGS. 5C and 5D illustrate an example of the second method. FIG. 5C is a screenshot of a messaging interface presented by the online system 140 when operating in the regular access mode, and FIG. 5D is a screenshot of the messaging interface in the limited access mode. In the regular access mode, each message thread 515A through 515H in the user's account is accessible in the messaging interface. In addition, the messaging interface includes a graphical element 520A through 520H next to each message thread, and the user can mark a message thread by selecting the corresponding graphical element. In the example shown in FIG. 5C, the user has marked six of the eight message threads 515A-515D, 515F, and 515H shown in the messaging interface. As a result, the messaging interface shows the six marked message threads in the limited access mode (as shown in FIG. 5D), but the two unmarked message threads are inaccessible. Instead, two additional marked message threads 525A, 525B (which would have been displayed on the second page in the regular access mode) are shown so that the messaging interface still shows eight message threads at once.

In the example shown in FIG. 5C, the online system 140 allows the user to mark every message in a message thread with a single action. The online system 140 may additionally or alternatively allow the user to mark individual messages or to mark messages by some other characteristic, such as by their source (e.g., a single action to mark every message received from a particular user account). More broadly, the online system 140 can allow the user to mark any type of data item, such as events, contacts, and files, either individually or by any characteristic or property associated with the data item.

Figure 5E:
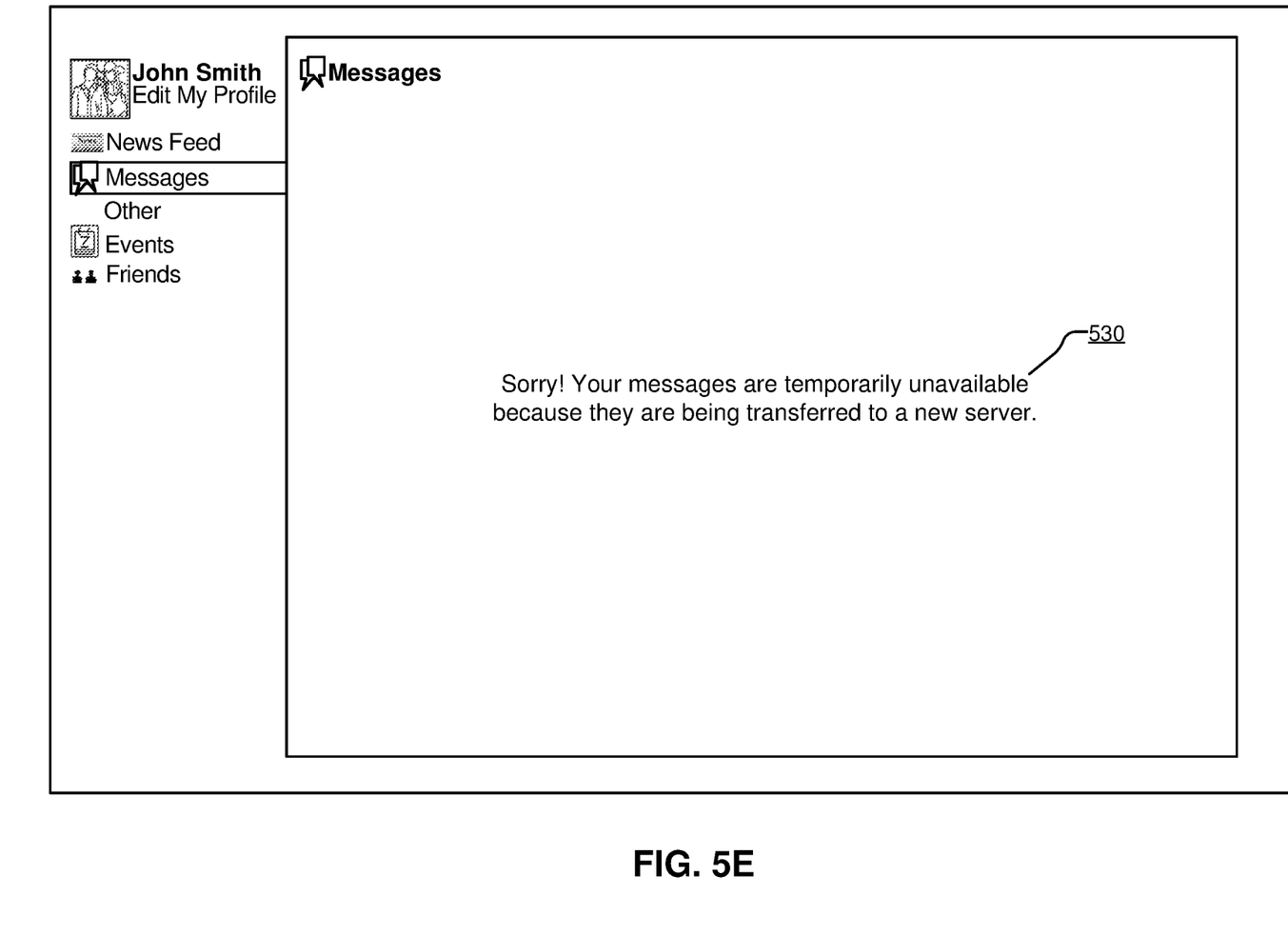
FIG. 5E is a screenshot illustrating an example of still another method of making data items inaccessible in the limited access mode, in accordance with an embodiment of the invention.

In a third method, the online system 140 makes data items inaccessible in the limited access mode by displaying a mock error message that provides the appearance of a technical error. FIG. 5E illustrates an example of the third method. In the example shown in FIG. 5E, all of the user's messages are inaccessible in the limited access mode. When the user attempts to access the messages in the limited access mode, the online system 140 instead shows an error message 530 indicating that the user's messages are being transferred to a new server.

In addition to making certain data items inaccessible, the online system 140 can also modify the operation of some of the interface modules 205 through 230 when a user account is being accessed in the limited access mode. For example, in the regular access mode, the content feed interface module 210 selects and orders content items using a process that accounts for a variety of factors associated with the user, such as affinity scores representing the user's level of interest in a variety of topics, brand pages, or other users. As a result, the content items selected using this process may reveal a substantial amount of information about the user. To prevent the content feed from revealing this information in the limited access mode, the content feed interface module 210 can use a different selection and ordering process when the user account is being accessed in the limited access mode. For instance, the process used in the limited access mode selects the most popular content items on the online system 140 and present these content items in decreasing order of popularity. As another example, the process randomly selects content items that the user's friends have posted in a preceding time interval (e.g., the preceding 24 hours) and presents them in reverse chronological order or in a random order.

In some embodiments, the limited access mode uses a combination of these methods. For instance, publicly accessible profile information and any marked events and contacts remain accessible in the limited access mode, a mock error message is displayed when the user attempts to access the private messages associated with the user account, and content items in the content feed are selected and ordered using a different process. In the regular access mode, the online system 140 may provide one or more control interfaces that allow the user to customize the method used to display or hide each data item in the limited access mode.

Restoring Normal Access to the User Account

Figure 6:
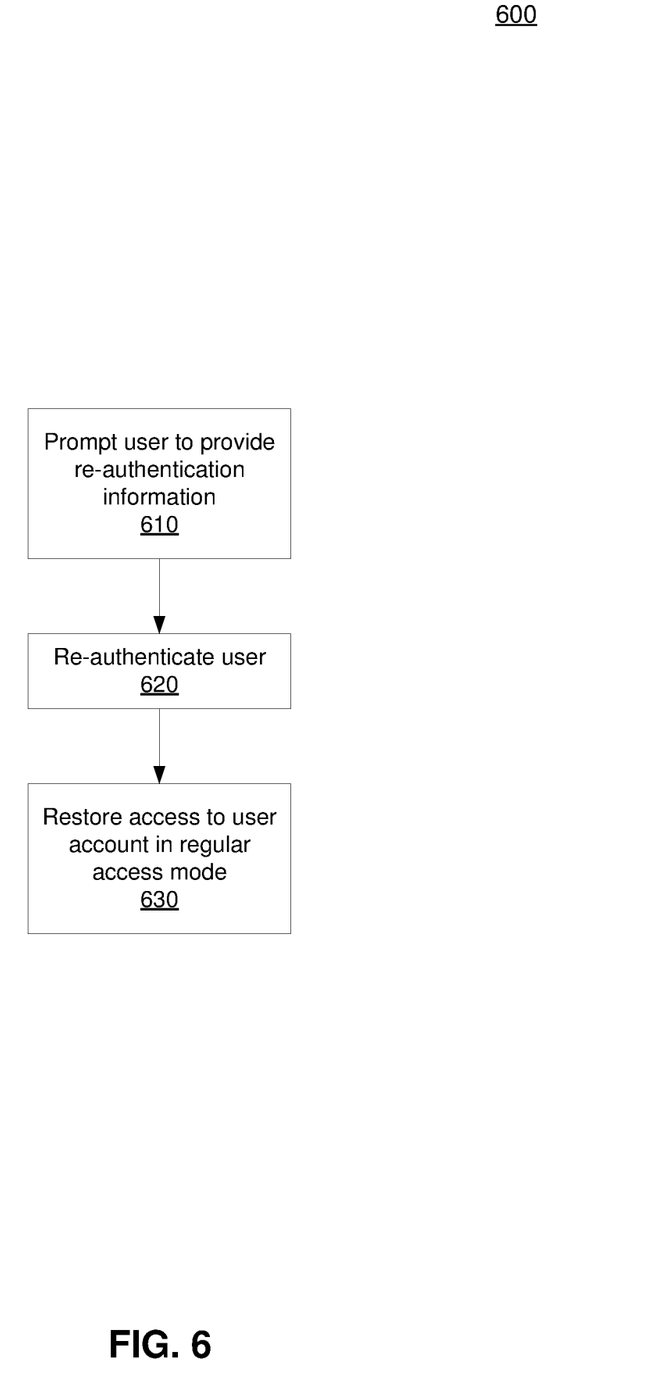
FIG. 6 is a flow chart illustrating a process for re-authenticating a user to restore access to the user account in the regular access mode, in accordance with an embodiment of the invention.

FIG. 6 is a flow chart illustrating a method 600 for re-authenticating a user to restore access to the user account in the regular access mode. In other embodiments, the method may include different and/or additional steps than those shown in FIG. 6. Additionally, steps of the method may be performed in different orders than the order described in conjunction with FIG. 6 in various embodiments.

The online system 140 prompts 610 a user to provide re-authentication information. In some embodiments, the re-authentication information includes the user's user name and primary password. The re-authentication information may additionally or alternatively include information other than the user's user name and primary password. For instance, the user may be prompted to provide a special recovery password that is different from both the primary and duress passwords, answer one or more security questions, provide a token generated by a multi-factor authentication application or device, or provide a one-time code that the online system 140 sends to the user (e.g., as an email or a text message sent via SMS).

In some embodiments, the online system 140 prompts 610 the user to provide the re-authentication information by initiating a communication through a communication channel that is independent of the online system 140. For example, if the online system 140 is a social networking system, the online system 140 sends a message to an email address controlled by the user. The email message instructs the user to provide the re-authentication information by sending a reply email or by calling a customer support phone number for the online system 140.

In other embodiments, the user can initiate the re-authentication process by logging out of the user account and logging back in with the primary password. In this case, the online system 140 may display a special re-authentication interface that prompts the user to provide the additional re-authentication information described above.

Measures such as requiring the user to provide additional information beyond the primary password or prompting the user to provide the re-authentication information through an independent communication channel provides an extra layer of security that makes it more difficult for an attacker to restore regular access to the user account.

The online system 140 may additionally or alternatively implement a lock-out time period as a separate security measure for the re-authentication process. For example, the online system 140 initiates a lock-out time period (e.g., 72 hours) when the user accesses the user account in the limited access mode by providing the duress password. During the lock-out time period, the user cannot be re-authenticated. For instance, if the online system 140 prompts 610 the user for the re-authentication information by initiating a communication though an independent communication channel, the online system 140 does not send the communication until after the lock-out time period has elapsed. As another example, the online system 140 does not re-authenticate the user during the lock-out time period even if the user provides the correct re-authentication information. When accessing the user account in the regular access mode, the online system 140 may provide a user interface that allows the user to specify the length of the lock-out period and enable, disable, or customize any of the security measures described above.

If the online system 140 verifies the re-authentication information subject to any security measures that have been implemented, then the online system 140 re-authenticates 620 the user. Upon re-authenticating the user, the online system 140 restores 630 access to the user account. After restoring access 630, the user can once again access the user account in the regular access mode and view the data items that were made inaccessible in the limited access mode.

Limited Access for an Application or Operating System on a Computing Device

Although the methods 400, 600 shown in FIGS. 4 and 6 were described with respect to an online system 140, the same methods 400, 600 can also be implemented on a client device, such as the client device 110 described above with respect to FIG. 3. For example, the methods 400, 600 can be used for granting limited access to a user account on the operating system of the client device 110. Data items associated with a user account on the operating system may include, for example, the contacts, messages, emails, photos, and other types of files that are stored in a directory associated with the user account. As another example, the methods 400, 600 can be used for granting limited access to a native application on the client device 110 that prompts the user to provide a password before displaying one or more data items. For instance, the native application may be a decryption application that uses a password to decrypt a file or folder or a password manager application that allows the user to view and copy multiple locally-stored plaintext passwords upon providing a single master password.

In an embodiment where the methods 400, 600 are implemented on a client device 110, the client device 110 may prompt 420 the user to provide a password without providing a user name. For example, many mobile computing devices (e.g., tablet computers and smartphones) are typically used by a single user, and the operating system maintains a single user account on the device. On these mobile devices, the operating system prompts the user to provide a password (e.g., a four- or six-digit numerical passcode or a path through a grid of dots) when a user attempts to access the user account.

Furthermore, in an embodiment where the methods 400, 600 are implemented on a client device 110, the passwords can be provided to a biometric sensor in the client device 110 that scans and recognizes a body part of the user. In these embodiments, the primary and duress passwords may be defined as different body parts of the user. For example, if the biometric sensor is a fingerprint sensor, the primary password and duress passwords may be different fingers. As another example, if the biometric sensor is an iris scanner, the primary and duress passwords may be different eyes. As still another example, if the biometric sensor is a facial recognition system, the primary and duress passwords may be different facial expressions. The operating system of the client device 110 (or a dedicated hardware or firmware module of the client device 110) receives data from the biometric sensor and determines whether the user has provided a body part corresponding to the primary password or the duress password, and an access mode is selected 430 accordingly.

In the same manner as the method 400 described above, the client device 110 grants access to the user account in a regular access mode if the user provides the primary password and grants access in a limited access mode if the user provides the duress password. The client device 110 can use the same methods described above to make some of the data items inaccessible in the various applications 305 through 320 and to re-authenticate the user before restoring regular access to the user account.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer-readable storage medium containing computer program code for performing the steps:
    storing a set of passwords in association with a user account on an online system, the set of passwords comprising a primary password and a duress password;
    prompting a user to provide a user name and a password to gain access to the user account, the user name uniquely identifying the user account on the online system;
    responsive to determining that the user has provided the primary password, granting access to the user account in a regular access mode, wherein a plurality of data items associated with the user account are accessible to the user in the regular access mode; and
    responsive to determining that the user has provided the duress password, granting access to the user account in a limited access mode, wherein at least one data item associated with the user account is inaccessible to the user in the limited access mode and is accessible to the user in the regular access mode, and wherein a second set of data items associated with the user account are publicly accessible on the online system, and wherein the second set of data items is accessible to the user in the limited access mode, wherein the second set of data items comprises information stored as part of a user profile associated with the user account.

2. The computer program product of claim 1, the steps further comprising:
    before storing the set of passwords in association with the user account, receiving the primary password and the duress password from the user.

3. The computer program product of claim 1, the steps further comprising:
    before storing the set of passwords in association with the user account, receiving the primary password from the user; and
    generating the duress password based at least in part on the primary password.

4. The computer program product of claim 1, wherein a set of data items associated with the user account is not publicly accessible on the online system, and wherein the set of data items is not accessible to the user in the limited access mode.

5. The computer program product of claim 1, wherein the set of data items comprise messages sent between the user account and a second user account of the online system.

6. The computer program product of claim 1, wherein the online system is configured to select content items for presentation to the user in a user interface, wherein a first selection process is used to select the content items in the regular access mode, and wherein a second selection process is used to select the content items in the limited access mode.

7. The computer program product of claim 1, the steps further comprising:
    while the user is accessing the user account in the regular access mode, receiving an indication from the user to make one or more of the data items accessible in the limited access mode; and
    responsive to receiving the indication, marking the one or more data items, wherein the marked data items are accessible to the user in the limited access mode.

8. The computer program product of claim 1, the steps further comprising:
    while the user is accessing the user account in the limited access mode, providing an error message for presentation to the user responsive to the user attempting to access a data item that is inaccessible to the user in the limited access mode.

9. The computer program product of claim 1, the steps further comprising:
    after granting access to the user account in the limited access mode, prompting the user to provide re-authentication information, the re-authentication information comprising at least one item of authentication information different from the primary password;
    re-authenticating the user based on the re-authentication information; and
    after re-authenticating the user, restoring access to the user account in the regular access mode.

10. The computer program product of claim 9, the steps further comprising:
    initiating a lock-out time period responsive to granting access to the user account in the limited access mode, wherein the user cannot be re-authenticated during the lock-out time period.

11. The computer program product of claim 10, the steps further comprising:
    while the user is accessing the user account in the regular access mode, changing the lock-out time period based on a user input received from the user.

12. The computer program product of claim 1, the steps further comprising:
    during the limited access mode, responsive to a request for the at least one data item associated with the user account that is inaccessible to the user in the limited access mode, displaying a mock error message that provides the appearance of a technical error.

13. A computer program product comprising a non-transitory computer-readable storage medium containing computer program code for performing the steps:
    storing a set of passwords in association with a user account on a computing device, the set of passwords comprising a primary password and a duress password;
    prompting a user to provide a password to gain access to the computing device;
    responsive to determining that the user has provided the primary password, granting access to the user account on the computing device in a regular access mode, wherein a plurality of data items are accessible to the user in a user interface of the computing device in the regular access mode;
    responsive to determining that the user has provided the duress password, granting access to the user account on the computing device in a limited access mode, wherein at least one data item that is accessible to the user in the regular access mode is inaccessible to the user in the limited access mode;
    while the user is accessing the user account in the regular access mode, receiving an indication from the user to make one or more of the data items accessible in the limited access mode; and responsive to receiving the indication, marking the one or more data items, wherein the marked data items are accessible to the user in the limited access mode.

14. The computer program product of claim 13, wherein a first predetermined set of data items associated with the user account is accessible to the user in the limited access mode, and wherein as second predetermined set of data items associated with the user account is inaccessible to the user in the limited access mode.

15. The computer program product of claim 13, the steps further comprising:
    while the user is accessing the user account in the limited access mode, providing an error message for presentation to the user responsive to the user attempting to access a data item that is inaccessible to the user in the limited access mode.

16. The computer program product of claim 13, the steps further comprising:
    after granting access to the user account in the limited access mode, prompting the user to provide re-authentication information, the re-authentication information comprising at least one item of authentication information different from the primary password;
    re-authenticating the user based on the re-authentication information; and
    after re-authenticating the user, restoring access to the user account in the regular access mode.

17. The computer program product of claim 16, the steps further comprising:
    initiating a lock-out time period responsive to granting access to the user account in the limited access mode, wherein the user cannot be re-authenticated during the lock-out time period.

18. The computer program product of claim 13, the steps further comprising:
    during the limited access mode, responsive to a request for the at least one data item associated with the user account that is inaccessible to the user in the limited access mode, displaying a mock error message that provides the appearance of a technical error.

19. A computing device comprising:
a processor; and
a non-transitory computer-readable storage medium having computer program code stored thereon, the computer program code when executed by the processor causing the processor to perform steps comprising:
    storing a set of passwords in association with a user account on a computing device, the set of passwords comprising a primary password and a duress password,
    prompting a user to provide a password to gain access to the computing device,
    responsive to determining that the user has provided the primary password, granting access to the user account on the computing device in a regular access mode, wherein a plurality of data items are accessible to the user in a user interface of the computing device in the regular access mode,
    responsive to determining that the user has provided the duress password, granting access to the user account on the computing device in a limited access mode, wherein at least one data item that is accessible to the user in the regular access mode is inaccessible to the user in the limited access mode;
    while the user is accessing the user account in the regular access mode, receiving an indication from the user to make one or more of the data items accessible in the limited access mode; and
    responsive to receiving the indication, marking the one or more data items, wherein the marked data items are accessible to the user in the limited access mode.

20. The computing device of claim 19, the steps further comprising:
    during the limited access mode, responsive to a request for the at least one data item associated with the user account that is inaccessible to the user in the limited access mode, displaying a mock error message that provides the appearance of a technical error.

\* \* \* \* \*